(12) United States Patent
Guzman et al.

(10) Patent No.: US 8,419,402 B2
(45) Date of Patent: Apr. 16, 2013

(54) FOAM STIFFENED HOLLOW COMPOSITE STRINGER

(75) Inventors: Juan C. Guzman, Seattle, WA (US); Douglas A. McCarville, Orting, WA (US); Daniel M. Rotter, Lake Forest Park, WA (US); Barry P. VanWest, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/005,786

(22) Filed: Jan. 13, 2011

(65) Prior Publication Data

US 2011/0111183 A1 May 12, 2011

Related U.S. Application Data

(62) Division of application No. 11/937,006, filed on Nov. 8, 2007, now Pat. No. 7,879,276.

(51) Int. Cl.
*B29C 65/00* (2006.01)
*B64C 1/06* (2006.01)

(52) U.S. Cl.
USPC ........... 425/110; 425/393; 425/403; 264/156; 264/275

(58) Field of Classification Search .................. 264/241, 264/275, 248, 156, 46.4; 425/393, 403, 110; 156/182; 244/177 R
See application file for complete search history.

(56) References Cited

U.S. PATENT DOCUMENTS

| | | | |
|---|---|---|---|
| 1,987,337 A | 1/1935 | Hammerling | |
| 2,491,418 A | 12/1949 | Schlesman | |
| 2,561,756 A | 7/1951 | Shook | |
| 2,630,472 A | 3/1953 | Mcarthur | |
| 3,028,292 A * | 4/1962 | Hinds | 156/214 |
| 3,205,288 A * | 9/1965 | Bates | 264/255 |
| 3,390,393 A | 6/1968 | Upton | |
| 3,530,021 A | 9/1970 | Reichl | |
| 3,779,487 A * | 12/1973 | Ashton et al. | 244/123.5 |
| 3,963,425 A | 6/1976 | Sambrook | |
| 4,019,291 A | 4/1977 | Ernst | |
| 4,053,667 A | 10/1977 | Smith | |
| 4,079,903 A * | 3/1978 | Ashton et al. | 244/123.5 |

(Continued)

FOREIGN PATENT DOCUMENTS

| | | |
|---|---|---|
| DE | 1949209 A1 | 4/1971 |
| EP | 0215698 A2 | 3/1987 |

(Continued)

OTHER PUBLICATIONS

U.S. Appl. No. 12/508,281, filed Jul. 23, 2009, Fahley et al.

(Continued)

*Primary Examiner* — Joseph S Del Sole
*Assistant Examiner* — Nahida Sultana
(74) *Attorney, Agent, or Firm* — Yee & Associates, P.C.

(57) ABSTRACT

A method and apparatus for a composite stringer. A method is used for manufacturing a hollow composite stringer. Foam is formed with a mandrel installed into the foam. A composite material and the foam is laid up onto a tool in a form of a stringer. The composite material and the foam in the form of the stringer is cured to form a cured stringer. The mandrel from the foam is removed to form the hollow composite stringer.

4 Claims, 7 Drawing Sheets

U.S. PATENT DOCUMENTS

| | | | |
|---|---|---|---|
| 4,197,545 A | 4/1980 | Favaloro et al. | |
| 4,510,500 A | 4/1985 | Brune | |
| 4,538,780 A * | 9/1985 | Roe | 244/123.5 |
| 4,776,907 A | 10/1988 | Massions | |
| 4,792,493 A | 12/1988 | Bertram et al. | |
| 5,170,666 A | 12/1992 | Larsen | |
| 5,222,166 A | 6/1993 | Weltha | |
| 5,242,523 A | 9/1993 | Willden et al. | |
| 5,268,392 A | 12/1993 | Bertram | |
| 5,271,986 A | 12/1993 | Dublinski et al. | |
| 5,332,178 A | 7/1994 | Williams | |
| 5,348,601 A | 9/1994 | Ray | |
| 5,363,464 A | 11/1994 | Way et al. | |
| 5,403,424 A | 4/1995 | Ehrat et al. | |
| 5,415,504 A | 5/1995 | Wolf et al. | |
| 5,458,330 A | 10/1995 | Baum | |
| 5,527,414 A | 6/1996 | Dublinski et al. | |
| 5,624,622 A | 4/1997 | Boyce et al. | |
| 5,632,940 A | 5/1997 | Whatley | |
| 5,647,658 A | 7/1997 | Ziadi | |
| 5,854,336 A | 12/1998 | Divone, Sr. et al. | |
| 5,863,635 A | 1/1999 | Childress | |
| 5,958,550 A | 9/1999 | Childress | |
| 6,039,832 A | 3/2000 | McCarville | |
| 6,116,179 A | 9/2000 | Swinbanks et al. | |
| 6,117,376 A | 9/2000 | Merkel | |
| 6,159,414 A | 12/2000 | Tunis, III et al. | |
| 6,187,411 B1 | 2/2001 | Palmer | |
| 6,198,445 B1 | 3/2001 | Alt et al. | |
| 6,450,678 B1 | 9/2002 | Bayersdorfer | |
| 6,458,309 B1 * | 10/2002 | Allen et al. | 264/319 |
| 6,497,190 B1 | 12/2002 | Lewit | |
| 6,510,961 B1 | 1/2003 | Head et al. | |
| 6,529,127 B2 | 3/2003 | Townsend et al. | |
| 6,632,502 B1 | 10/2003 | Allen et al. | |
| 6,638,466 B1 | 10/2003 | Abbott | |
| 6,653,980 B2 | 11/2003 | Ceccom et al. | |
| 6,689,246 B2 | 2/2004 | Hirahara et al. | |
| 6,739,861 B2 | 5/2004 | Cournoyer et al. | |
| 6,755,998 B1 | 6/2004 | Reichard et al. | |
| 6,889,937 B2 | 5/2005 | Simpson et al. | |
| 6,949,282 B2 | 9/2005 | Obeshaw | |
| 6,960,993 B2 | 11/2005 | Mattes et al. | |
| 6,963,728 B2 | 11/2005 | Edwards et al. | |
| 6,999,857 B1 | 2/2006 | Kasper et al. | |
| 7,001,082 B2 | 2/2006 | Morrison | |
| 7,018,217 B2 | 3/2006 | Marshall et al. | |
| 7,063,763 B2 | 6/2006 | Chapman, Jr. | |
| 7,074,474 B2 | 7/2006 | Toi et al. | |
| 7,118,370 B2 | 10/2006 | Willden et al. | |
| 7,159,822 B2 | 1/2007 | Grantham et al. | |
| 7,205,956 B1 | 4/2007 | Sychaleun et al. | |
| 7,207,523 B2 | 4/2007 | Callahan et al. | |
| 7,216,832 B2 | 5/2007 | Simpson et al. | |
| 7,231,180 B2 | 6/2007 | Benson et al. | |
| 7,246,521 B2 | 7/2007 | Kim | |
| 7,263,889 B2 | 9/2007 | Kennedy et al. | |
| 7,268,517 B2 | 9/2007 | Rahmel et al. | |
| 7,276,703 B2 | 10/2007 | Berkcan et al. | |
| 7,277,822 B2 | 10/2007 | Blemel | |
| 7,281,318 B2 | 10/2007 | Marshall et al. | |
| 7,307,431 B2 | 12/2007 | Safai et al. | |
| 7,343,265 B2 | 3/2008 | Andarawis et al. | |
| 7,400,253 B2 | 7/2008 | Cohen | |
| 7,419,627 B2 | 9/2008 | Sheu et al. | |
| 7,513,769 B2 | 4/2009 | Benson et al. | |
| 7,719,416 B2 | 5/2010 | Arms et al. | |
| 7,749,421 B2 | 7/2010 | Callis et al. | |
| 7,830,523 B2 | 11/2010 | Bommer et al. | |
| 7,830,888 B2 | 11/2010 | Donovan | |
| 7,861,969 B2 | 1/2011 | Guzman et al. | |
| 7,864,039 B2 | 1/2011 | Georgeson | |
| 7,871,040 B2 | 1/2011 | Lee et al. | |
| 7,879,276 B2 | 2/2011 | Guzman et al. | |
| 7,963,815 B2 | 6/2011 | Mead | |
| 8,022,793 B2 | 9/2011 | Olson et al. | |
| 8,022,843 B2 | 9/2011 | Mitchell et al. | |
| 8,026,257 B2 | 9/2011 | Degnan et al. | |
| 8,026,857 B2 | 9/2011 | Bommer | |
| 8,042,767 B2 | 10/2011 | Velicki et al. | |
| 8,044,812 B2 | 10/2011 | Harres | |
| 8,083,182 B2 | 12/2011 | Cacciaguerra | |
| 8,094,062 B2 | 1/2012 | Hook | |
| 8,098,143 B2 | 1/2012 | Andarawis et al. | |
| 8,100,361 B2 | 1/2012 | Grauerholz | |
| 8,115,448 B2 | 2/2012 | John | |
| 8,128,030 B2 | 3/2012 | Dannenberg | |
| 8,154,402 B2 | 4/2012 | Tayrani et al. | |
| 8,234,924 B2 | 8/2012 | Saxena et al. | |
| 2001/0017336 A1 | 8/2001 | Hirahara et al. | |
| 2002/0011047 A1 | 1/2002 | Obeshaw | |
| 2002/0050925 A1 | 5/2002 | Arms et al. | |
| 2002/0178992 A1 | 12/2002 | Lewit | |
| 2003/0098520 A1 | 5/2003 | Cournoyer et al. | |
| 2003/0192990 A1 | 10/2003 | Simpson et al. | |
| 2003/0216149 A1 | 11/2003 | Edwards et al. | |
| 2004/0048582 A1 | 3/2004 | Mattes et al. | |
| 2004/0051214 A1 | 3/2004 | Sheu et al. | |
| 2004/0150529 A1 | 8/2004 | Benoit et al. | |
| 2004/0166408 A1 | 8/2004 | Anderson et al. | |
| 2005/0003145 A1 | 1/2005 | Toi et al. | |
| 2005/0056362 A1 | 3/2005 | Benson et al. | |
| 2005/0128028 A1 | 6/2005 | Sanchez et al. | |
| 2005/0186994 A1 | 8/2005 | Rahmel et al. | |
| 2005/0211843 A1 | 9/2005 | Simpson et al. | |
| 2005/0213548 A1 | 9/2005 | Benson et al. | |
| 2005/0230552 A1 * | 10/2005 | Engwall et al. | 244/133 |
| 2005/0259919 A1 | 11/2005 | Aldridge et al. | |
| 2006/0226287 A1 | 10/2006 | Grantham et al. | |
| 2007/0046298 A1 | 3/2007 | Safai et al. | |
| 2007/0090294 A1 | 4/2007 | Safai et al. | |
| 2007/0109121 A1 | 5/2007 | Cohen | |
| 2007/0114422 A1 | 5/2007 | Berkcan et al. | |
| 2007/0118335 A1 | 5/2007 | Andarawis et al. | |
| 2007/0145638 A9 | 6/2007 | Mead | |
| 2007/0151375 A1 | 7/2007 | Kennedy et al. | |
| 2007/0176840 A1 | 8/2007 | Pristas et al. | |
| 2008/0036617 A1 | 2/2008 | Arms et al. | |
| 2008/0089087 A1 | 4/2008 | Stoner | |
| 2008/0111024 A1 | 5/2008 | Lee et al. | |
| 2008/0157429 A1 * | 7/2008 | Callis et al. | 264/232 |
| 2008/0185478 A1 | 8/2008 | Dannenberg | |
| 2008/0226876 A1 | 9/2008 | Roth | |
| 2008/0290214 A1 | 11/2008 | Guzman et al. | |
| 2009/0057487 A1 | 3/2009 | Velicki et al. | |
| 2009/0058361 A1 | 3/2009 | John | |
| 2009/0101756 A1 | 4/2009 | Cacciaguerra | |
| 2009/0108211 A1 | 4/2009 | Bommer et al. | |
| 2009/0127393 A1 | 5/2009 | Guzman et al. | |
| 2009/0184877 A1 | 7/2009 | Bommer | |
| 2009/0243895 A1 | 10/2009 | Mitchell et al. | |
| 2009/0325628 A1 | 12/2009 | Becker | |
| 2010/0011865 A1 | 1/2010 | Saxena et al. | |
| 2010/0114383 A1 | 5/2010 | Rosca et al. | |
| 2010/0129589 A1 | 5/2010 | Senibi et al. | |
| 2010/0141377 A1 | 6/2010 | Andarawis et al. | |
| 2010/0176939 A1 | 7/2010 | Harres | |
| 2010/0231382 A1 | 9/2010 | Tayrani et al. | |
| 2010/0318243 A1 | 12/2010 | Lewis et al. | |
| 2011/0018686 A1 | 1/2011 | Fahley et al. | |
| 2011/0027526 A1 | 2/2011 | McCarville et al. | |
| 2011/0049935 A1 * | 3/2011 | Locher et al. | 296/193.07 |
| 2011/0076461 A1 * | 3/2011 | Jacob et al. | 428/178 |
| 2011/0080057 A1 | 4/2011 | Bowman et al. | |
| 2011/0088833 A1 | 4/2011 | Guzman et al. | |
| 2011/0139932 A1 * | 6/2011 | Matheson et al. | 244/132 |
| 2011/0188862 A1 | 8/2011 | Fuss et al. | |
| 2011/0250384 A1 * | 10/2011 | Sumi et al. | 428/118 |
| 2011/0254267 A1 * | 10/2011 | Marengo | 285/405 |

FOREIGN PATENT DOCUMENTS

| | | |
|---|---|---|
| GB | 1522432 A | 8/1978 |
| JP | 4329125 A | 11/1992 |
| JP | 2005291708 | 10/2005 |
| WO | 8601039 A1 | 2/1986 |
| WO | 2004102056 | 11/2004 |
| WO | 2005096571 A1 | 10/2005 |

| WO | 2005105402 | A  | 11/2005 |
| WO | 2007041256 |    | 4/2007  |
| WO | 2008010841 | A1 | 1/2008  |
| WO | 2008076020 |    | 6/2008  |
| WO | 2009023346 |    | 2/2009  |
| WO | 2009055218 |    | 4/2009  |
| WO | 2010040004 | A1 | 4/2010  |
| WO | 2010065330 |    | 6/2010  |
| WO | 2010144248 |    | 12/2010 |
| WO | 2011011110 |    | 1/2011  |
| WO | 2011016931 |    | 2/2011  |

OTHER PUBLICATIONS

U.S. Appl. No. 12/534,356, filed Aug. 3, 2009, McCarville et al.
Marasco et al., "Mechanical Properties Balance in Novel Z-pinned Sandwich Panels; Out-of-Plane Properties". Composites Part A: Applied Science and Manufacturing, Elsevier Science Publishers, Amsterdam, NL, vol. 37, No. 2, Feb. 2006, pp. 295-302.
Seibert et al., "Applications for PMI Foams in Aerospace Sandwich Structures", Reinforced Plastics, Elsevier Advanced Technology, NY, vol. 50, No. 1, Jan. 2006, pp. 44-48.
"Communication and Power Through Structural Airframe Stringers for On-board Wireless Sensors", pp. 1-10, retrieved Jun. 18, 2009. https://sqi-pw-01.nw.nos.boeing.com/structures/StratProjects/bp1_12_18_08/BTEC2009WirelessBusDraft12.17.09.pdf.
USPTO Office Action for U.S. Appl. No. 11/753,482 dated Mar. 31, 2010.
USPTO Final Office Action for U.S. Appl. No. 11/753,482 dated Jul. 19, 2010.
USPTO Notice of Allowance for U.S. Appl. No. 11/753,482 dated Sep. 7, 2010.
USPTO Office Action for U.S. Appl. No. 11/937,006 dated Dec. 30, 2009.
USPTO Final Office Action for U.S. Appl. No. 11/937,006 dated Jun. 22, 2010.
USPTO Notice of Allowance for U.S. Appl. No. 11/937,006 dated Oct. 6, 2010.
PCT Search Report for application No. PCT/US2009/065195; dated Mar. 8, 2010.
"How about this? Avionics would go in plane's skin", Electronics, VNU Business Puyblications, New York, US, vol. 60, No. 21, Oct. 15, 1987.
PCT Search Report for application PCT/US2010/036082 dated Nov. 18, 2010.
Ko, "The future of sensor and actuator systems", Sensors and Actuators, Elsevier Sequoia S.A. Lausanne, CH vol. 56 No. 1, Aug. 1, 1996, pp. 193-197.
PCt Search Report for application PCT/US2010/036130 dated Mar. 1, 2011.
PCT Search for application PCT/US2010/040668 dated Feb. 17, 2011.
UPSTO Non-final office action for U.S. Appl. No. 12/277,483 dated May 31, 2011.
O'Brien et al., "Assessment of Composite Delamination Self-Healing via Micro-Encapsulation", Proceedings of American Society for Composites 23rd Technical Conference, Sep. 2008.
Greenhaigh et al., "The Assessment of Novel Materials and Processes for the Impact Tolerant Design of Stiffened Composite Aerospace Structures", Composites: Part A, 34, 2003, pp. 151-161.
Shibata et al., "Experimental study on NDT method using electromagnetic waves", Journal of Materials Processing Technology, vol. 161, No. 1-2, Apr. 2005, pp. 348-352 (Abstract).
Partridge et al., "Manufacture and Performance of Z-Pinned Composites", Advance Polymeric Materials: Structure Property Relationships, CRC Press, Apr. 2003, pp. 98-137.
Hill et al., "Aperture Excitation of Electrically Large, Lossy Cavities", IEEE Transactions on Electromagnetic Compatibility, vol. 36, No. 3, Aug. 1994, pp. 169-178.

Hladio et al., "A passive wireless displacement sensor for structural health monitoring of civil structures", Proceedings of SPIE Nondestructive Characterization for Composite Materials, Aerospace Engineering, Civil Infrastructure, and Homeland Security 2007 SPIE US, vol. 6531, Apr. 2007, pp. 653114 (Abstract).
USPTO Notice of Allowance dated Dec. 2, 2010 for U.S. Appl. No. 11/937,006, 4 pages.
USPTO Office Action dated Jan. 4, 2011 for U.S. Appl. No. 12/016,018, 9 pages.
USPTO Office Action dated Jul. 9, 2010 for U.S. Appl. No. 12/016,018, 6 pages.
USPTO Notice of Allowance dated Jun. 27, 2011 for U.S. Appl. No. 12/016,018, 7 pages.
USPTO Office Action dated May 10, 2012 for U.S. Appl. No. 12/976,070, 31 pages.
USPTO Office Action dated May 7, 2012 for U.S. Appl. No. 12/484,151, 38 pages.
USPTO Final Office Action dated May 9, 2012 for U.S. Appl. No. 12/508,281, 43 pages.
USPTO Office Action dated Nov. 10, 2011 for U.S. Appl. No. 12/508,281, 46 pages.
USPTO Office Action dated Jun. 7, 2012 for U.S. Appl. No. 12/534,356, 34 pages.
USPTO Supplemental Notice of Allowance dated Oct. 13, 2010 for U.S. Appl. No. 11/753,482, 4 pages.
USPTO Final Office Action dated Nov. 2, 2011 for U.S. Appl. No. 12/277,483, 12 pages.
USPTO Office Action dated Feb. 24, 2012 for U.S. Appl. No. 12/277,483, 19 pages.
USPTO Office Action dated Feb. 23, 2010 for U.S. Appl. No. 11/925,622, 19 pages.
USPTO Notice of Allowance dated Jul. 12, 2010 for U.S. Appl. No. 11/925,622, 6 pages.
PCT Search Report dated Apr. 23, 2009 regarding international application No. PCT/US2008/064427, 3 pages.
PCT Search Report dated Jun. 16, 2009 regarding international application No. PCT/US2008/078438, 6 pages.
EPO Search Report dated Jul. 15, 2011 regarding application No. 09756924.8-2124 (PCT/US2009065195), applicant's reference NAM/P116420EP00, applicant The Boeing Company, 8 pages.
Abbasi et al., "Microwave Nondestructive Detection of Longitudinal Cracks in Pipe with U-bend and Prediction of its Location by Signal Processing", Electromagnetic Nondestructive Evaluation, vol. 31, Oct. 2008, pp. 154-161 (Abstract).
Caspers et al., "Waveguide Mode Reflectometry for Obstacle Detection in the LHC Beam Pipe Including Signal Attenuation", Proceedings of the 2003 Particle Accelerator Conference, vol. 4, No. 12, May 2003, pp. 2700-2702.
Hatfield et al., "Electromagnetic Reverberation Characteristics of a Large Transport Aircraft", Naval Surface Warfare Center Dahlgren Division, NSWCDD/TR-93/339, Jul. 1994, 95 pages.
Notice of Allowance, dated Oct. 15, 2012, regarding USPTO U.S. Appl. No. 12/976,070, 19 pages.
Final Office Action, dated Aug. 6, 2012, regarding USPTO U.S. Appl. No. 12/277,483, 14 pages.
Notice of Allowance, dated Nov. 7, 2012, regarding USPTO U.S. Appl. No. 12/277,483, 7 pages.
Office Action, dated Dec. 13, 2012, regarding USPTO U.S. Appl. No. 12/484,151, 32 pages.
Office Action, dated Nov. 7, 2012, regarding USPTO U.S. Appl. No. 12/508,281, 26 pages.
Final Office Action, dated Oct. 26, 2012, regarding USPTO U.S. Appl. No. 12/534,358, 28 pages.

* cited by examiner

TOP FOAM

TRAPEZOID

HORIZONTAL TRIPLE STRIPE

SPACE NEEDLE

I-BEAM

TRIPLE STRIPE

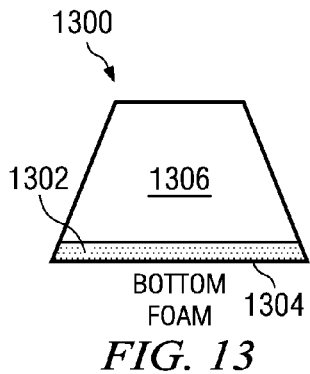
FIG. 13 — BOTTOM FOAM
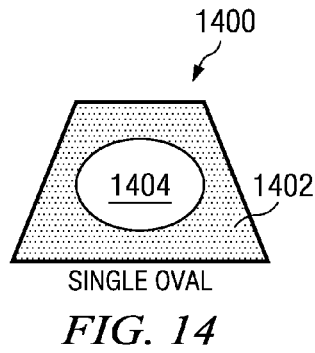
FIG. 14 — SINGLE OVAL
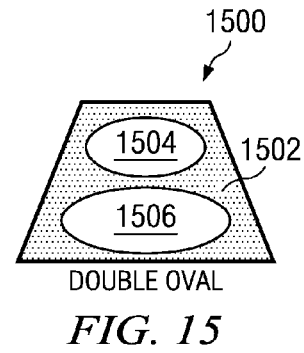
FIG. 15 — DOUBLE OVAL
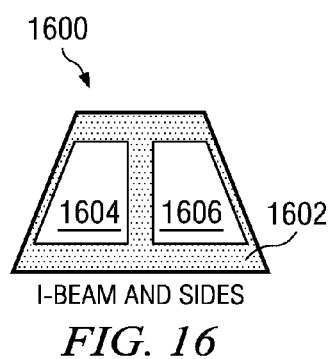
FIG. 16 — I-BEAM AND SIDES
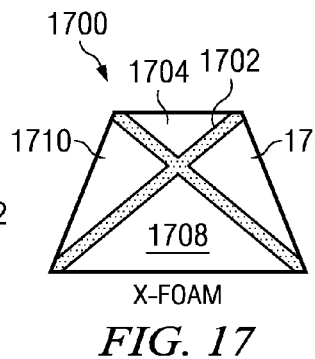
FIG. 17 — X-FOAM
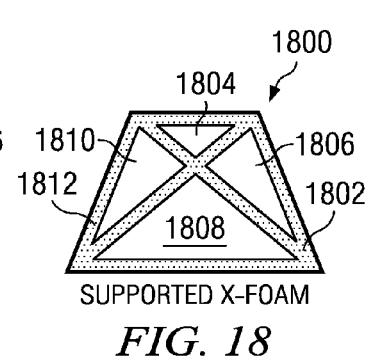
FIG. 18 — SUPPORTED X-FOAM
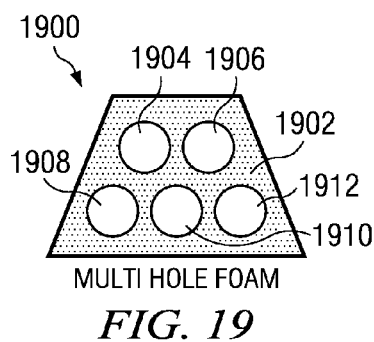
FIG. 19 — MULTI HOLE FOAM
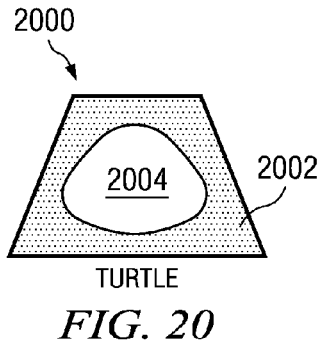
FIG. 20 — TURTLE
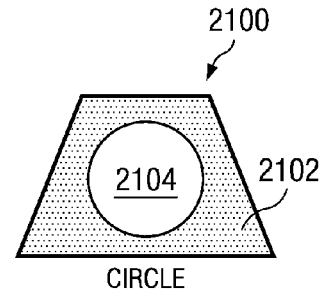
FIG. 21 — CIRCLE
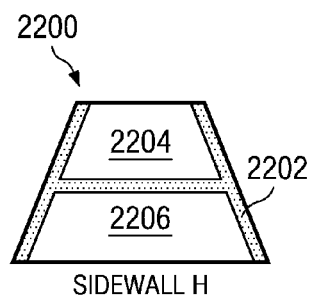
FIG. 22 — SIDEWALL H
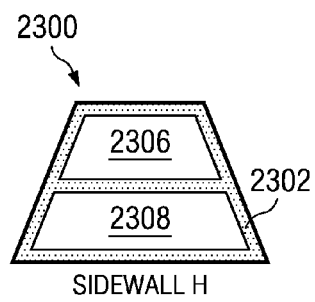
FIG. 23 — SIDEWALL H
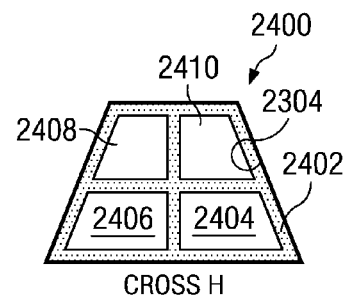
FIG. 24 — CROSS H

FOAM STIFFENED HOLLOW COMPOSITE STRINGER

This application is a divisional of application Ser. No. 11/937,006, filed Nov. 8, 2007, now U.S. Pat. No. 7,879,276.

BACKGROUND INFORMATION

1. Field

The present disclosure relates generally to aircraft parts and in particular to aircraft stringers. Still more particularly, the present disclosure relates to a method and apparatus for a composite stringer.

2. Background

Aircraft generally include an airframe, which may be regarded as an underlying skeleton, to which skin panels are attached to form a smooth aerodynamic outer surface. The wings also include an underlying structure covered with skin panels. Typically, skin panels are light and thin to minimize the weight of the aircraft and increase its payload and range. Since skin panels are thin, they are generally flexible and require stiffening to prevent undesired movement, flexing, and vibration during flight.

Hat stringers have been used for decades in the aerospace industry for stiffening metal fuselage sections and metal wing skins on both commercial and military aircraft. These stringers are composed of thin metal panels with acute angles that result in a trapezoidal shape. Relatively simple metal-forming techniques are used to bend the metal into the acute angles required for this shape. These metal-forming techniques include brake forming or rolling the metal into the hat stringer shape. These techniques allow the production of hat stringers with tight, constant angular bends and straight or flat legs.

In manufacturing composite hat stringers, a hat stringer may be placed on a fuselage skin in which the interior of the hat stringer has a hollow section that is formed with a bladder. These bladders are inserted into the composite stringer prior to performing curing processes. A curing process is a process that toughens or hardens a polymer material in the composite stringer. These bladders are inflated to support the internal structure of the composite stringer during the curing process in an oven or autoclave.

One drawback with the use of bladders is that in some cases a bladder may have a defect resulting in a deflation of the bladder inside of a composite stringer during the curing process. This deflation may result in an improperly formed composite stringer. As a result the stringer is discarded and manufactured again. The problems that may occur with deflation of a bladder during curing of a composite stringer include, for example, an improper shape for the stringer, ply movement, ply wrinkling, or porosity.

Therefore, it would be advantageous to have a method and apparatus that overcomes the above-described problems.

SUMMARY

The advantageous embodiments provide a method and apparatus for a composite stringer. In one advantageous embodiment, a method is used for manufacturing a hollow composite stringer. Foam is formed with a mandrel installed into the foam. A composite material and the foam is laid up onto a tool in a form of a stringer. The composite material and the foam in the form of the stringer is cured to form a cured stringer. The mandrel from the foam is removed to form the hollow composite stringer.

In another advantageous embodiment, a method is present for manufacturing a hollow composite part. A composite part is formed with a first channel extending from a first end to a second end of the composite part. A foam core is formed within the first channel. A set of channels is created within the foam core to form the hollow composite part.

In yet another advantageous embodiment, an apparatus comprises a composite part having a first channel and foam located in the first channel, wherein the foam has a set of channels.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIGS. 7-31 are diagrams illustrating cross-sections of composite stringers with foam stiffened hollow cores with different channel configurations in accordance with an advantageous embodiment;

DETAILED DESCRIPTION

Figure 1:
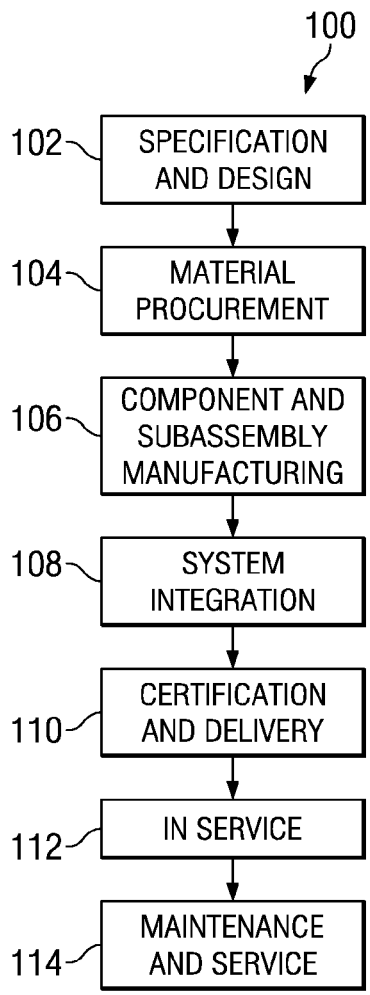
FIG. 1 is a diagram illustrating an aircraft manufacturing and service method in accordance with an advantageous embodiment.
Figure 2:
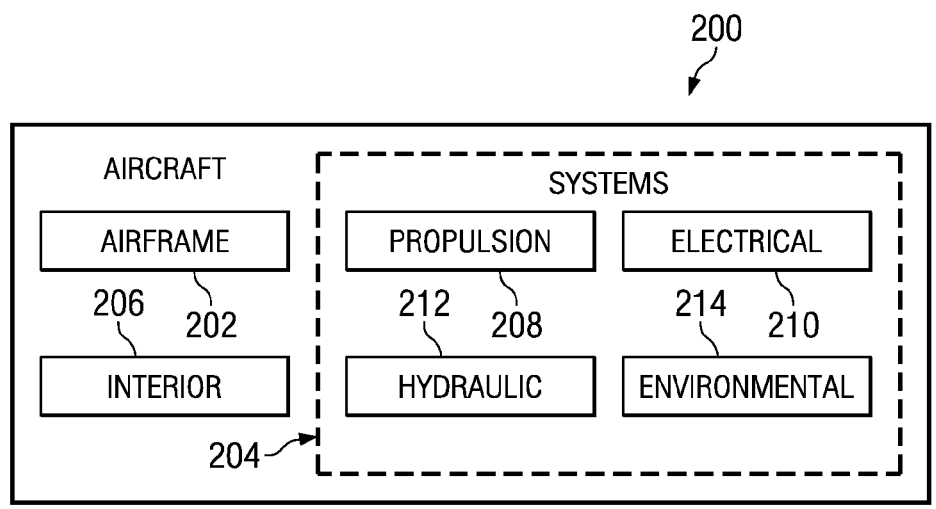
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize that other materials may be used in place of an inflatable bladder to form a cavity or channel within a composite part. A composite part with a channel is also referred to as a hollow composite part. The illustrative examples of the advantageous embodiments described herein are directed towards a composite part in the form of a stringer. Of course, the advantageous embodiments may be employed with other types of composite parts other than composite stringers. For example, the different advantageous embodiments may be applied to composite parts, such as, for example, without limitation truss, fluted, hat, and beaded core structures.

The advantageous embodiments recognize that hard tools may be used to form a composite stringer. These hard tools may be made from, for example, silicone rubber or machined aluminum. The different advantageous embodiments, however, realize that in various components such as fuselage barrels, wing skins, and door plan panels, the shape of the composite stringers may have complex contours making these types of tooling options hard or impossible to remove from long panels to form a hollow composite stringer. A long panel may be, for example, a panel that is around 50 feet to around 100 feet long.

The different advantageous embodiments recognize that an alternative material that may be used is foam in place of hard tools to help shape the composite stringer. Further, this type of material may remain in the stringer as part of the structure. Foam filled composite stringers have numerous advantages over conventional hollow composite stringers. These advantages include, for example, increased impact resistance, improved structural properties, acoustical deadening, moisture infiltration reduction, simplified fabrication, reduced handling needs, elimination of a need for noodles (radius support fillers) or wrap plies, reduced tendency to bow out when placed over padups, and flow time reductions.

The different advantageous embodiments, however, also recognize that the weight added through the use of foam within composite stringers may be greater than desired as compared to a hollow composite stringer. Lower density foams with less weight often are unfeasible because these types of foams may not survive or remain intact during the heating that occurs in curing the stringer. Higher density foams have increased weight.

As a result, the different advantageous embodiments recognize that it would be advantageous to have a method and apparatus for manufacturing a composite part having a channel containing foam in which the foam also has a channel. The amount of foam remaining within the composite part is selected in a manner to provide advantages associated with foam remaining within a composite part while reducing weight.

Thus, the different advantageous embodiments provide a method and apparatus for manufacturing a hollow composite part with foam. The composite part is formed having a first channel. The channel may extend from a first end to a second end of the composite part. A foam core is formed within the first channel. A second channel is created within the foam core to form the hollow composite part.

Figure 3:
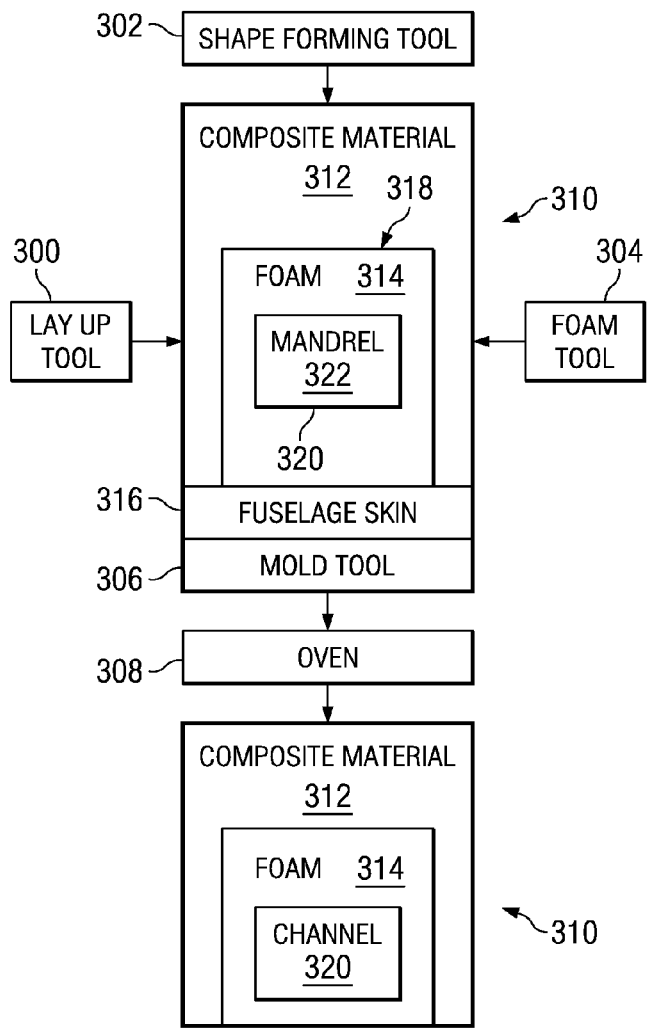
FIG. 3 is a diagram illustrating components used to manufacture a foam stiffened hollow composite stringer in accordance with an advantageous embodiment.

With reference now to FIG. 3, a diagram illustrating components used to manufacture a foam stiffened hollow composite stringer is depicted in accordance with an advantageous embodiment. In these examples, lay up tool 300, shape forming tool 302, foam tool 304, mold tool 306, and autoclave\oven 308 are used in these examples to manufacture composite part 310.

Composite material 312 and foam 314 are formed on fuselage skin 316 in these examples. Composite material 312 has channel 318 in which foam 314 is located. Channel 318 may extend all the way through composite part 310, from one end of composite part 310 to another end of composite part 310. In other embodiments, channel 318 may only extend partially through composite part 310. Foam 314 has channel 320 in which mandrel 322 is located in these examples.

Composite material 312 may be processed using lay up tool 300 and shape forming tool 302. Lay up tool 300 is used in this example to stack or lay up plies of composite material 312 into a layer for composite part 310. The layer may also be referred to as a flat charge. The flat charge is processed by shape forming tool 302 to form the desired shape for composite part 310. In these examples, composite part 310 is a composite stringer with a hat shape.

Lay up tool 300 may be implemented using various composite material processing tools, such as, for example, an M.Torres lay up, which is a tape layer machine available from M.Torres. Another example of a machine that may be used for lay up tool 300 is Access-Atlas, which is a composite working machine, which is available from Forest-Liné. Shape forming tool 302 may be implemented using a machine or tool that is capable of forming composite material into the desired shape. A forming die or press may be used to implement shape forming tool 302. An example of a press that may be used is a composite spar drape forming machine.

Foam 314 is a foam core located within channel 318. Foam 314 is formed by foam tool 304 in these examples. In these examples, foam 314 may be made from various materials. Foam 314 also is referred to as a polymer or cellular polymer foam. Foam 314 may be manufactured from a two-phased mixture in which gases, bubbles, or cells are disbursed within a solid polymeric resin. These bubbles or cells may be created through chemical additives. For example, a gas may be created by polymerization reaction or thermal decomposition. These cells also may be created within the resin through physical blowing agents, such as inert gases. Cells created in this manner may be open and loosely interconnected or closed and detached.

When a higher percentage of closed cells are present in a foam, the density of the foam is higher as well as the weight. In these examples, foam 314 may be made through a number of different methods including, for example, combining blowing agents in liquid resin and then curing the mixture in a mold, through extrusion, compression or injection molding, or solid-state fabrication.

Foam 314 may be implemented with any foam that can remain intact during a curing process. Examples of foams that may be used for foam 314 include, for example, without limitation, Last-A-Foam containing polyisocyanurate, which is available from General Plastics; Aircell containing aromatic polyester, which is available from Polyumac; Performa-H containing polyimide which is available from GFT Corporation; Corecell containing styrene acrylo-nitrile, which is available from Gurit; RIMA containing polymethacryllmide, which is available from Degussa/Rohacell; Airex containing polyetherimide, which is available from Alcan/Baltek; PrimoSpire/Parmax containing polyphenylenes, which is available from Solvay/Mississippi Poly Tech; LCP containing polyetherether-ketone, which is available from Wright Materials Research Company; Zotek containing polyvinylidene fluoride, which is available from ZoteFoams; Elfoam containing polyisocyanurate, which is available from Elliott Company; and Divinycell HT containing poly vinyl chloride, which is available from Diab.

Foam 314 may be formed with mandrel 322 in place or mandrel 322 being inserted into foam 314 afterwards. Foam tool 304 may be implemented using any machine that is capable for forming foam 314. An example of a machine that may be used to implement foam tool 304 is a TVZ series machine, such as TVZ 4P manufactured by Teubert.

In this illustrative embodiment, mandrel 322 is a removable mandrel that is placed into foam 314. Mandrel 322 may have various shapes depending on the desired shape for channel 320. Mandrel 322 is an elongate member that may be made out of various materials.

Examples of materials for mandrel 322 include, for example, hard silicone rubber, protruded fiberglass, extruded Teflon, aluminum, combinations of these materials, or any other suitable material. Mandrel 322 may be made from any relatively inflexible material that can stay intact within autoclave\oven 308. Further, mandrel 322 does not need to inflate or swell to introduce pressure to the surface of channel 318.

Composite part 310 on fuselage skin 316 and mold tool 306 are placed into autoclave\oven 308 to perform a curing process. Mold tool 306 may be, for example, an inside mold line tool or an outside mold line tool, depending on the implementation. The temperatures in autoclave\oven 308 may be around 350 degrees Fahrenheit. Additionally, autoclave\oven 308 also may introduce pressure in performing the curing process for composite part 310. The pressure may be, for example, around 100 pounds per square inch. The heating causes polymer materials, such as resins, in composite material 312 to flow. When polymers harden, composite part 310 is considered to be cured in these examples.

Autoclave\oven 308 may be implemented using any machine that is capable of curing composite components. For example, an autoclave\oven may be used. An Anchor autoclave from Anchor Autoclave Systems or an autoclave available from Taricco Corporation are examples of autoclaves that may be used to implement autoclave\oven 308. Composite part 310 also may be cured using other mechanisms other than autoclave\oven 308 in other embodiments. For example, electron beam curing may be used to cure composite material 312.

After curing has occurred, composite part 310 is removed from autoclave\oven 308 and mandrel 322 is removed from foam 314 to leave channel 320 within foam 314. In these examples, foam 314 may provide features and advantages as described above with respect to having foam located inside the composite part. Channel 320 within foam 314 aids in reducing weight. The size and configuration of the channel may be selected based on properties and features provided by these configurations.

Figure 4:
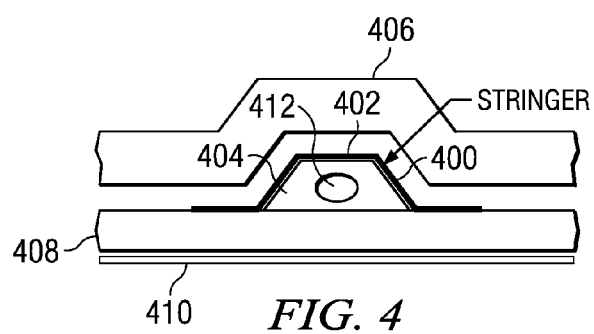
FIG. 4 is a diagram illustrating an example lay up of composite materials on an inside mold line for a composite stringer in accordance with an advantageous embodiment.

Turning now to FIG. 4, a diagram illustrating an example lay up of composite materials on an inside mold line tool for a composite stringer is depicted in accordance with an advantageous embodiment. In this example, composite stringer 400 includes composite material 402 and foam 404. Composite material 402 is laid up over foam 404. Foam 404 is placed into inside mold line tool 406. Then fuselage skin 408 is placed or laid up onto composite material 402, foam 404, and inside mold line tool 406. Caul 410 is placed against fuselage skin 408 in these examples.

Foam 404 has mandrel 412, which is removable. In other advantageous embodiments, mandrel 412 is not present within foam 404. Instead, a channel cavity may be formed after the curing process has occurred. The channel may be formed, for example, by drilling the cavity with a drill or other tool. Typically, this type of lay up is used to manufacture a hat composite stringer, which is a stringer with acute angles in a trapezoidal shape.

Figure 5:
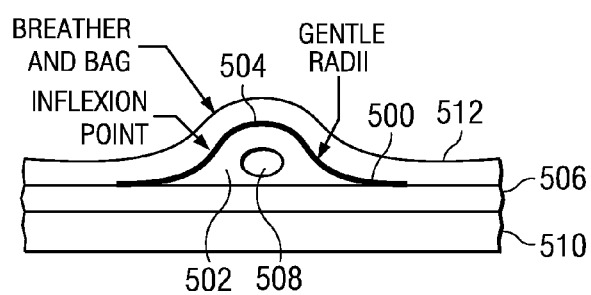
FIG. 5 is a diagram illustrating an example lay up of composite materials on an outside mold line for a composite stringer in accordance with an advantageous embodiment.

Turning now to FIG. 5, a diagram illustrating an example lay up of composite materials on an outside mold line tool for a composite stringer is depicted in accordance with an advantageous embodiment. In this example, composite stringer 500 includes foam 502 and composite material 504. Foam 502 is placed on fuselage skin 506. Composite material 504 is placed or laid up over foam 502 and fuselage skin 506. As in the other example, foam 502 includes mandrel 508, which is a removable component. These components form composite stringer 500 in a pre-cured state on outside mold line tool 510. In this example, bag 512 is placed over composite stringer 500 for curing composite stringer 500.

In these examples, mandrel 508 is located within foam 502. In other advantageous embodiments, mandrel 508 is not present within foam 502. Instead, a channel cavity may be formed after the curing process has occurred. The channel may be formed, for example, by drilling the cavity with a drill or other tool.

Figure 6:
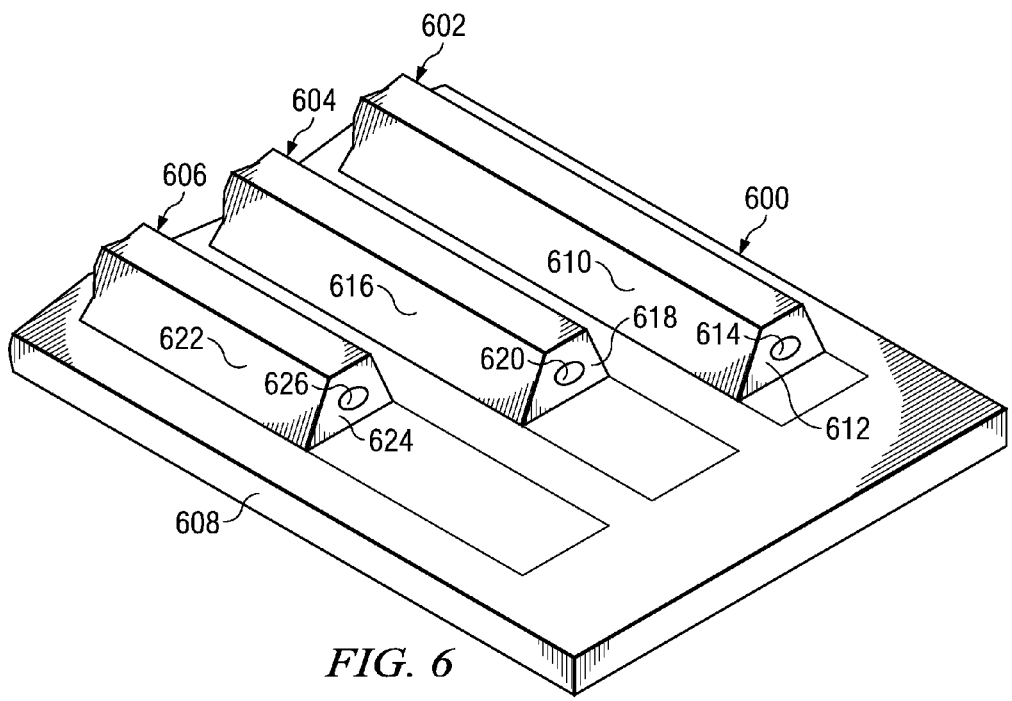
FIG. 6 is a perspective view of composite stringers containing foam with hollowed channels or sections in accordance with an advantageous embodiment.

Turning now to FIG. 6, a perspective view of composite stringers containing foam with hollowed channels or sections is depicted in accordance with an advantageous embodiment. In this example, assembly 600 includes composite stringers 602, 604, and 606 mounted on fuselage skin 608. Composite stringer 602 includes composite material 610 and foam 612 with channel 614 being present within foam 612. Composite stringer 604 includes composite material 616 and foam 618 with channel 620 being formed within foam 618. Composite stringer 606 includes composite material 622 and foam 624. Foam 624 has channel 626. The foam with these stringers provides additional advantages over stringers having a channel without foam.

Turning next to FIGS. 7-31, diagrams illustrating cross-sections of composite stringers with foam stiffened hollow cores with different channel configurations is depicted in accordance with an advantageous embodiment. The different composite stringers illustrated in FIGS. 7-31 are examples of composite stringers that may be manufactured using an inside mold line tool.

Figure 7:
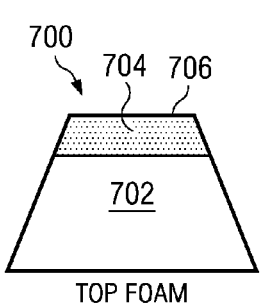
Figure 8:
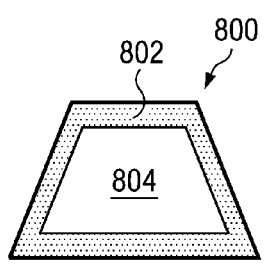
Figure 9:
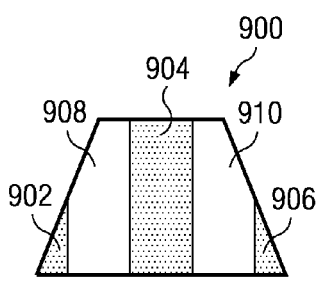
Figure 10:
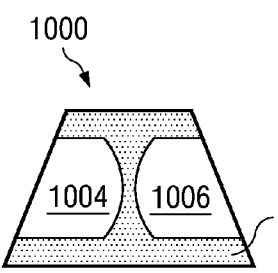
Figure 11:
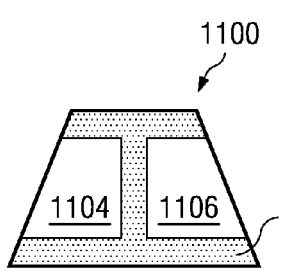

First, in FIG. 7, composite stringer 700 has trapezoid shaped channel 702 in which foam 704 is located at top side 706 of composite stringer 700. In FIG. 8, composite stringer 800 includes foam 802 in which channel 804 has a trapezoidal shape. In FIG. 9, composite stringer 900 has foam in sections 902, 904, and 906 leaving channel 908 and channel 910. In FIG. 10, composite stringer 1000 includes foam 1002 having a shape of a "space needle", leaving channels 1004 and 1006 within composite stringer 1000. Composite stringer 1100 in FIG. 11 includes foam 1102 in an I-beam shape with channel 1104 and channel 1106.

Figure 12:
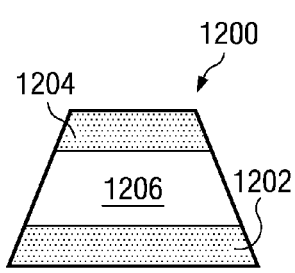
Figure 25:
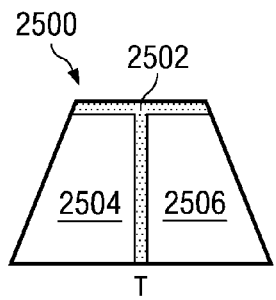
Figure 26:
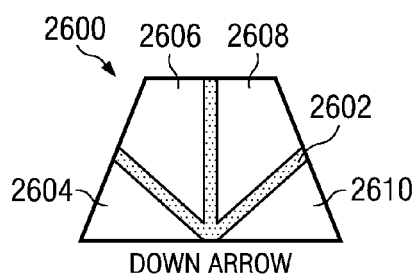

Next in FIG. 12, composite stringer 1200 includes foam in sections 1202 and 1204 with channel 1206 dividing sections 1202 and 1204. In FIG. 13, composite stringer 1300 includes foam 1302 at bottom side 1304 of composite stringer 1300 leaving channel 1306. Composite stringer 1400 in FIG. 14 includes foam 1402 with channel 1404 being in an oval shape. Then, composite stringer 1500 in FIG. 15 includes foam 1502 with channels 1504 and 1506 forming a double oval cross-section. Composite stringer 1600 in FIG. 16 shows foam 1602 in an I-beam configuration with channels 1604 and 1606. This type of configuration is in contrast with composite stringer 1100 in FIG. 11 in which foam is not continuous throughout the sides of the composite stringer.

In FIG. 17, composite stringer 1700 includes foam 1702 in an X shape with channels 1704, 1706, 1708, and 1710. With reference to FIG. 18, composite stringer 1800 has foam 1802 in a similar X shape. This X shape is referred to as a supported X-foam shape and includes channels 1804, 1806, 1808, and 1810. In this example, foam 1802 is present along inner surface 1812 of composite stringer 1800. Composite stringer 1900 in FIG. 19 includes foam 1902 with multiple hole channels 1904, 1906, 1908, 1910, and 1912. Composite stringer 2000 in FIG. 20 includes foam 2002. Channel 2004 within foam 2002 has a turtle shape in this example. In FIG. 21, composite stringer 2100 includes foam 2102 with channel 2104 in a circular shape.

Figure 27:
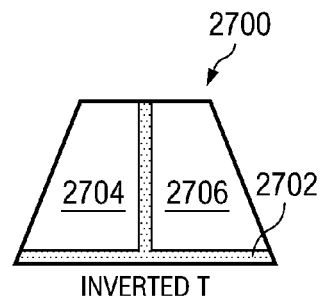

Turning to FIG. 22, composite stringer 2200 has foam 2202 in an H shape with channels 2204 and 2206. FIG. 23 depicts composite stringer 2300 with foam 2302 in an H shape in which foam 2302 extends all the way around inner surface 2304 of composite stringer 2300. Channels 2306 and 2308 are present. These channels have a trapezoidal shape and cross-section in these examples. In FIG. 24, composite stringer 2400 includes foam 2402 with a cross H shape having channels 2404, 2406, 2408, and 2410. Next, in FIG. 25, composite stringer 2500 includes foam 2502 in a T shape with channels 2504 and 2506. Composite stringer 2600 in FIG. 26 includes foam 2602 in a down arrow shape with channels 2604, 2606, 2608, and 2610. With reference next to FIG. 27, composite stringer 2700 includes foam 2702 in an inverted T shape with channels 2704 and 2706 being present.

Figure 28:
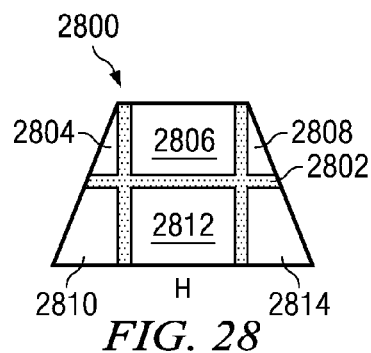
Figure 29:
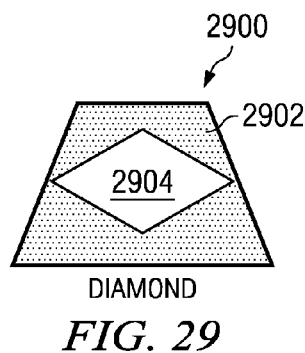
Figure 30:
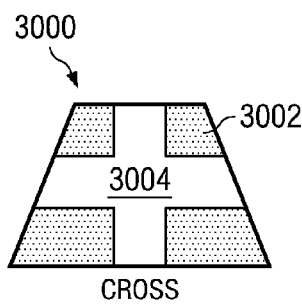
Figure 31:
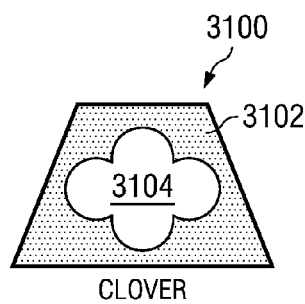

Composite stringer 2800 in FIG. 28 includes foam 2802 in an H shape with channels 2804, 2806, 2808, 2810, 2812, and 2814. In FIG. 29, composite stringer 2900 includes foam 2902 in which channel 2904 has a diamond shape. Composite stringer 3000 includes foam 3002 with channel 3004 being in a cross shape in FIG. 30. In FIG. 31, composite stringer 3100 includes foam 3102 with clover shape channel 3104.

These depicted cross-sections of composite stringers with foam cores and channels are provided for purposes of illustrating some configurations for the different foam cores and channels. Of course, other configurations may be used depending on the particular implementation.

Turning now to FIGS. 32-35, diagrams illustrating cross-sections of composite stringers with foam stiffened hollow cores with different channel configurations is depicted in accordance with an advantageous embodiment. In these examples, cross-sections of stringers are illustrated in which composite stringers are formed using an outside mold line tool.

Figure 32:
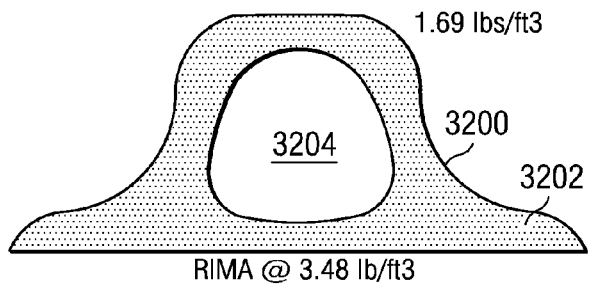
FIGS. 32-35 are diagrams illustrating cross-sections of composite stringers with foam stiffened hollow cores with different channel configurations in accordance with an advantageous embodiment.
Figure 33:
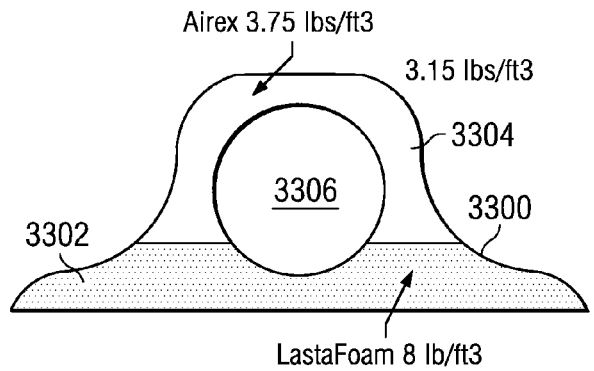

In FIG. 32, composite stringer 3200 includes foam 3202 with channel 3204. In FIG. 33, composite stringer 3300 includes foam 3302 and foam 3304 with channel 3306. In this example, two types of foam are used within composite stringer 3300.

Figure 34:
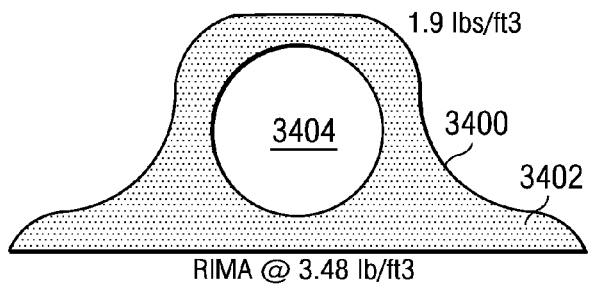
Figure 35:
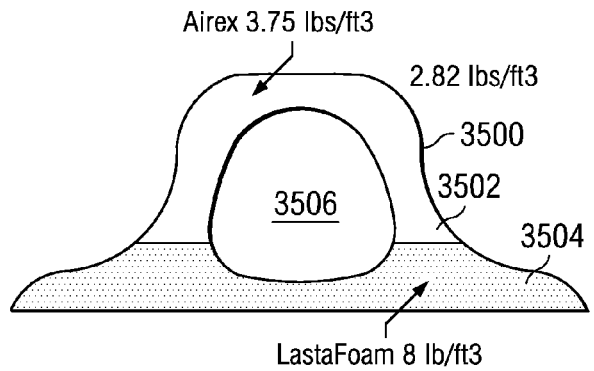

Next, in FIG. 34, composite stringer 3400 includes foam 3402 and circular shaped channel 3404. Composite stringer 3500 in FIG. 35 includes foam 3502 and foam 3504 with channel 3506. In this example, two types of foam also are used within composite stringer 3500.

Figure 36:
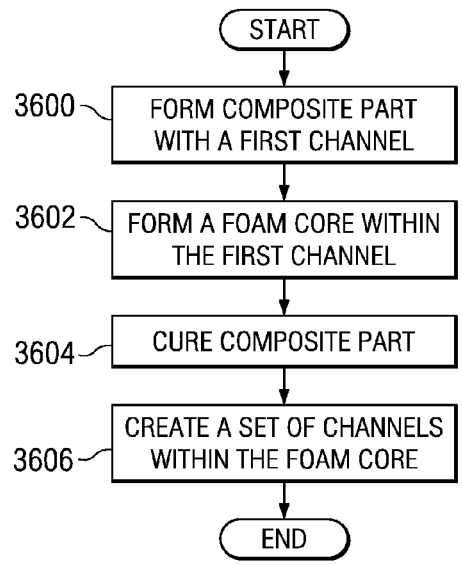
FIG. 36 is a high level flowchart of a process for forming a hollow composite part in accordance with an advantageous embodiment.

Turning now to FIG. 36, a high level flowchart of a process for forming a hollow composite part is depicted in accordance with an advantageous embodiment. The process illustrated in FIG. 36 may be implemented using tools illustrated in FIG. 3.

The process begins by forming a composite part with a first channel (operation 3600). The process also forms a foam core within the first channel (operation 3602). Next, the process cures a composite part (operation 3604). The process then creates a set of channels within the foam core (operation 3606) with the process terminating thereafter. The set of channels is one or more channels in these examples. The phrase "a set", when used herein, refers to one or more of an item. For example, a set of cores is one or more cores, and a set of mandrels is one or more mandrels.

In these examples, operations 3600 and 3602 may be interchangeable in terms of the order in which the operations are performed. For example, the foam core may be formed first with the composite part being formed around the foam core afterwards. In other embodiments, the composite part may be first formed and then the foam core is inserted into the composite part. The creation of the set of channels may be formed in a number of different ways. For example, a mandrel may be used for each channel within the foam core. In other embodiments, a channel may be formed at a later point in time after the composite part has been cured.

Figure 37:
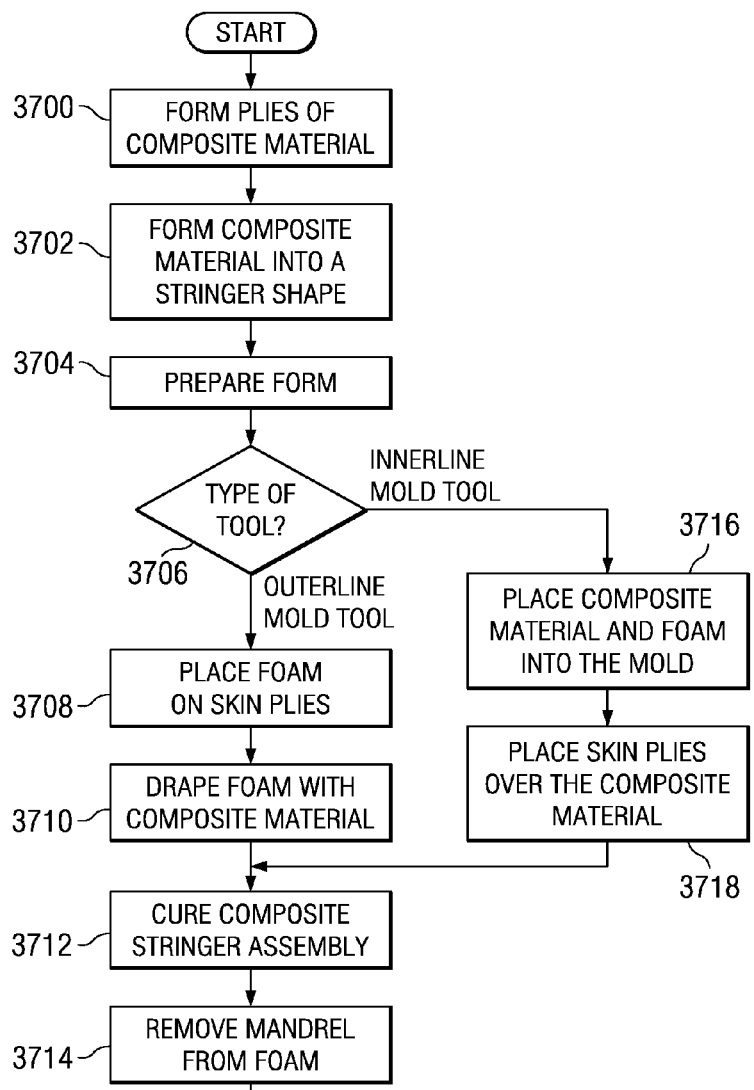
FIG. 37 is a flowchart of a process for manufacturing a composite stringer with a foam core in accordance with an advantageous embodiment.

Turning now to FIG. 37, a flowchart of a process for manufacturing a composite stringer with a foam core is depicted in accordance with an advantageous embodiment. The process illustrated in FIG. 37 may be implemented using tools depicted in FIG. 3.

The process begins by forming plies of composite material (operation 3700). This operation may involve cutting plies of composite tape and/or fabric, stacking the plies together, and vacuum compacting the composite material to form a flat charge. Thereafter, the composite material is formed into a stringer shape (operation 3702). Operation 3702 may involve using a dye or press to shape the flat charge into a stringer shape. The process then prepares the form (operation 3704). A removable mandrel is installed into the foam in operation 3704. In other instances, the foam may be formed around the mandrel.

Next, a determination is made as to the type of tool being used (operation 3706). If the tool is an outside mold line tool, the process places the foam onto skin plies (operation 3708). Thereafter, the foam is draped with the composite material (operation 3710).

The process then cures the composite stringer assembly (operation 3712). This curing operation also may include compacting the assembly with a vacuum in the autoclave\oven. The process then removes the mandrel from the foam (operation 3714) with the process terminating thereafter.

With reference again to operation 3706, if the type of tool is an inside mold line tool, the process places the composite material and the foam into the mold (operation 3716). Next, the process places skin plies over the composite material (operation 3718) with the process then proceeding to operation 3712 as described above.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a skin ply;
   a composite stringer placed on the skin ply, wherein the composite stringer comprises a hat shape cross-section comprising a first leg placed on a surface of the skin ply, a second leg placed on the surface of the skin ply, and a concave surface between the first leg and the second leg and wherein the composite stringer defines an elongated first channel between the concave surface of the composite stringer and a portion of the surface of the skin ply between the first leg and the second leg and extending from a first end to a second end of the composite stringer;
   foam located in the first channel; and
   a set of second channels in the foam such that the foam with the set of second channels in the foam is positioned between the concave surface of the composite stringer and the skin ply.

2. The apparatus of claim 1 further comprising:
   a set of removable mandrels located in the set of second channels in the foam.

3. The apparatus of claim 1, wherein the skin ply, the composite stringer, and the foam with the set of second channels is located in an aircraft.

4. The apparatus of claim 1, wherein the set of second channels are elongated channels extending in a direction substantially parallel to an axis extending along the first channel from the first end to the second end of the composite stringer.

* * * * *